United States Patent
Soehnlen et al.

(10) Patent No.: US 10,407,238 B2
(45) Date of Patent: Sep. 10, 2019

(54) METHOD AND PACKAGE FOR A FROZEN FOOD PRODUCT

(71) Applicant: CREATIVE EDGE DESIGN GROUP, LTD., Canton, OH (US)

(72) Inventors: Daniel P. Soehnlen, Canton, OH (US); Gregory M. Soehnlen, North Canton, OH (US); William Soehnlen, Uniontown, OH (US)

(73) Assignee: CREATIVE EDGE DESIGN GROUP LTD., Canton, OH (US)

( * ) Notice: Subject to any disclaimer, the term of this patent is extended or adjusted under 35 U.S.C. 154(b) by 352 days.

(21) Appl. No.: 14/775,300

(22) PCT Filed: Mar. 14, 2014

(86) PCT No.: PCT/US2014/028949
§ 371 (c)(1),
(2) Date: Sep. 11, 2015

(87) PCT Pub. No.: WO2014/144509
PCT Pub. Date: Sep. 18, 2014

(65) Prior Publication Data
US 2016/0031635 A1 Feb. 4, 2016

Related U.S. Application Data

(60) Provisional application No. 61/800,856, filed on Mar. 15, 2013.

(51) Int. Cl.
*B65D 85/78* (2006.01)
*A23G 9/50* (2006.01)
(Continued)

(52) U.S. Cl.
CPC .............. *B65D 85/78* (2013.01); *A23G 9/50* (2013.01); *B65B 25/007* (2013.01); *B65B 63/08* (2013.01); *B65D 65/38* (2013.01); *B65D 75/30* (2013.01)

(58) Field of Classification Search
CPC ...... B65D 85/78; B65D 77/00; B65D 77/003; B65D 25/007; B65D 75/30; B65D 85/72;
(Continued)

(56) References Cited

U.S. PATENT DOCUMENTS

| 2,166,560 A | 7/1939 | Schmelzer |
| 3,997,677 A | 12/1976 | Hirsch et al. |

(Continued)

FOREIGN PATENT DOCUMENTS

| DE | 92 00354 U1 | 5/1992 |
| EP | 0 196 799 A1 | 10/1986 |

(Continued)

OTHER PUBLICATIONS

The Shrinkage of Polymers. Plastribution. 2011. Retrieved from: <http://www.plastribution.co.uk/wp-content/uploads/2014/04/Shrinkage-Industry_know-how.pdf xcx.*
(Continued)

*Primary Examiner* — Ellen S Wood
*Assistant Examiner* — Ashley Axtell
(74) *Attorney, Agent, or Firm* — Fay Sharpe LLP

(57) ABSTRACT

A package for ice cream, and a process of packaging the food product are disclosed. Particularly, a first structural layer has a cavity and a flexible second layer is inserted therein. A food product such as ice cream is then introduced into the flexible second layer, and in one modification the food product may be covered with a flexible third layer, before freezing the food product. The freezing process
(Continued)

fractures the first structural layer while the second and third layers are preferably sealed about a perimeter.

20 Claims, 2 Drawing Sheets

(51) Int. Cl.
*B65B 25/00* (2006.01)
*B65B 63/08* (2006.01)
*B65D 65/38* (2006.01)
*B65D 75/30* (2006.01)

(58) Field of Classification Search
CPC .......... B65D 85/00; B65D 85/70; A23G 9/50; A23G 1/00; A23G 1/20; A23G 1/22; A23G 1/005; A23G 1/0063; A23G 1/0066; A23G 1/0073; A23G 9/221; A23G 9/00; A23G 9/04; A23G 9/08; A23G 9/083; B65B 25/007; B65B 63/08; B65B 11/52; B29C 33/68; B29C 51/10
USPC .......... 53/173; 426/389, 383, 512, 106, 392, 426/280, 524, 515, 327, 393; 425/436 R, 425/89; 249/112
See application file for complete search history.

(56) References Cited

U.S. PATENT DOCUMENTS

| | | | |
|---|---|---|---|
| 4,200,481 A | | 4/1980 | Faller |
| 4,337,116 A | | 6/1982 | Foster et al. |
| 4,413,461 A | * | 11/1983 | Waldstrom ........... A23G 3/0289 425/126.2 |
| 6,861,082 B2 | | 3/2005 | Laffont et al. |
| 2004/0262322 A1 | | 12/2004 | Middleton et al. |
| 2006/0193952 A1 | * | 8/2006 | Penttinen ................ B32B 27/10 426/106 |
| 2006/0284349 A1 | * | 12/2006 | Castiglioni ........... B29C 51/262 264/553 |
| 2008/0128433 A1 | | 6/2008 | Stauffer et al. |
| 2010/0003378 A1 | * | 1/2010 | Longo ................. B29C 44/5636 426/106 |

FOREIGN PATENT DOCUMENTS

| | | | | |
|---|---|---|---|---|
| FR | 2415966 A1 | * | 8/1979 | ............. A23G 9/083 |
| GB | 1 206 033 | | 9/1970 | |
| GB | 2 292 928 A | | 3/1996 | |
| WO | WO 9503221 A1 | * | 2/1995 | ............... A23G 9/08 |

OTHER PUBLICATIONS

WO 9503221 A1 Espacenet Translation.*
What is the difference between food safe and food grade?. RainSaucers. Nov. 2, 2012. Retrieved from: <http://rainsaucers.com/blog/2012/11/02/what-is-the-difference-between-food-safe-and-food-grade>.*
What is Food Grade Packaging?. USA Emergency Supply. May 22, 2012. Retrieved from: <https://web.archive.org/web/20120522181824/https://www.usaemergencysupply.com/information_center/food_storage_faq/what_is_food_grade_packaging.htm>.*
FR 2415966 Espacenet Translation.*
PCT/US2014/028949 International Search Report and Written Opinion, dated Aug. 1, 2014.
EP 14 76 2646.9 "Extended European Search Report", dated Oct. 18, 2016.

* cited by examiner

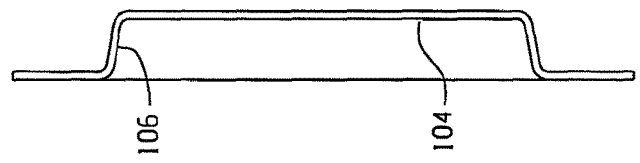
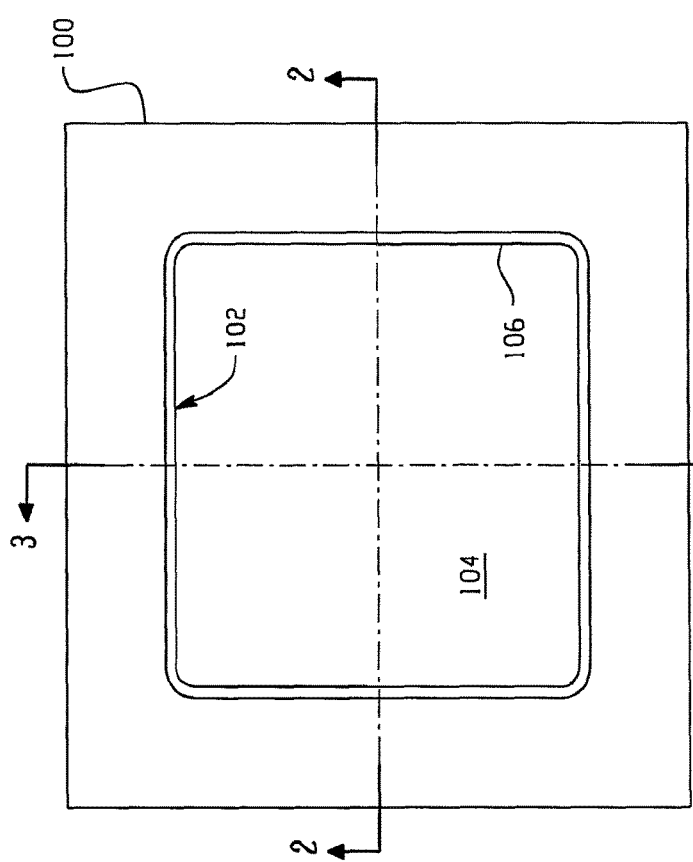

METHOD AND PACKAGE FOR A FROZEN FOOD PRODUCT

The assignee of the present application also is the assignee of commonly-owned U.S. Pat. Nos. 6,103,287; 6,355,290; and 6,889,837.

BACKGROUND OF THE INVENTION

This application relates to a process for manufacturing and packaging ice cream, and to an improved ice cream package for use in the process.

Ice cream containers range from paper, cardboard, plastic, or composites of these materials such as plastic coated paper, that are shaped in bricks, tubs, or rounds. Packages will range in size from pint, quart, half-gallon, gallon, five quart, and three gallon sizes.

Typically, ice cream is manufactured by mixing liquid ingredients in a mixing tank and feeding the mixed ingredients into a cooling unit where the mixture is reduced in temperature to about 20° F. The mixture becomes significantly more viscous, but is still flowable. If the flavor being manufactured includes solid items such as cookie parts, the solid items are mixed into the flowing material at this point. The chilled and fully mixed material is fed to a package filling machine which feeds the material into an ice cream package. The ice cream package is closed and shrink wrapped to other packages for more convenient handling. The packaged ice cream is usually placed in a hardening area for several hours where its temperature is reduced to 0° F. or below. The packaged, finished ice cream is then ready to be stored or shipped.

An inventory of completed ice cream products is kept at a low temperature, around −10° F. to −20° F. As will be appreciated, hardening of the ice cream under conventional processes not only takes several hours, but is also capital intensive with regard to the equipment required to complete this process. For example, one method of hardening packaged ice cream is called a roller bed process. Ice cream packages are placed on a roller-type conveyor in a cold room where cold air is circulated by blowers. The ice cream containers are maintained in the cold room for ten to twelve hours where hardening occurs. Another system provides moving trays upon which ice cream is disposed, the trays move within the cold room and cold air is blown around the ice cream while it moves on these trays. The movement results in decreased hardening time, but still several hours are required to harden the ice cream to appropriate finished temperatures. Still another process to harden ice cream is with a contact plate hardener. A coolant is passed through aluminum plates reducing the temperature to a very low level. Packages of ice cream are fed into the contact plate freezer. Plates contact lower and upper surfaces of the packages while heat is extracted from the ice cream into the chilled aluminum plate. Plate freezers are efficient when used with packages having flat tops and bottoms which can be packed adjacent one another with side walls in direct contact. Contact plate freezers, therefore, are often useable with brick packages but are not as well suited to tubs.

Convenience also has an impact on consumer enjoyment of ice cream. For example, three dimensional (3-D) contours are often desired for decorative ice cream. However, the ability to prepare the ice cream in various 3-D shapes is constrained by the cost of the packaging. First, only certain types of material may be used since it must be of food grade quality where it contacts the ice cream directly. This limits the range of materials that can be used. Secondly, although various types of plastic or polymeric materials are desirable because of low cost, there are also constraints associated with the temperature ranges imposed on the packaging.

Thus, there is a continued desire to have a food grade quality package that is a thin layer and permitted to be molded into 3-D shapes along at least one surface, and still provides an easy-open package for the consumer.

SUMMARY

An improved process for packaging a frozen food product includes providing a first structural layer having a cavity, inserting a flexible second layer in the cavity so that a portion thereof generally conforms thereto, filling the flexible second layer with a food product, and freezing the product.

The process further includes removing the first structural layer after the freezing step.

The process further includes providing an external package after the removing step.

The process also includes forming the first structural layer from a material that fractures during the freezing step.

The process preferably includes forming the first structural layer from a food grade material, and likewise the second layer from a food grade material.

The process may include covering the food product with a flexible third layer, again, preferably formed of a food grade material.

In a preferred arrangement, the first structural layer is a high impact polystyrene (HIP), the second layer is a very ductile material (preferably low density polyethylene, and the third layer (if used) is also a polyethylene.

An ice cream package includes a non-planar first package layer of a first thin material having a three dimensional recess formed therein and a second package layer having a substantially planar conformation dimensioned to cover the recess and seal about a perimeter of the recess.

The HIPs first layer and the polyethylene second layer are not adhered but when heated together, they are "bonded" like a static cling, and then when cooled the layers release from one another.

The HIPs material used to form the first layer is very brittle and is advantageously recycled (re-grind, re-heat, re-used).

A primary advantage of the invention is the reduced costs associated with the thin layer packaging.

Another advantage resides in the reduced energy costs associated with packaging a frozen food product such as ice cream in this manner.

Still other advantages and benefits of the invention will become apparent to one skilled in the art upon reading and understanding the following detailed description.

BRIEF DESCRIPTION OF THE DRAWINGS

FIG. 1 is a top plan view of a first structural layer having a central cavity.

FIG. 2 is a cross-sectional view taken generally along the lines 2-2 of FIG. 1.

FIG. 3 is a cross-sectional view taken generally along the lines 3-3 of FIG. 1.

DETAILED DESCRIPTION OF THE PREFERRED EMBODIMENTS

Figure 6:
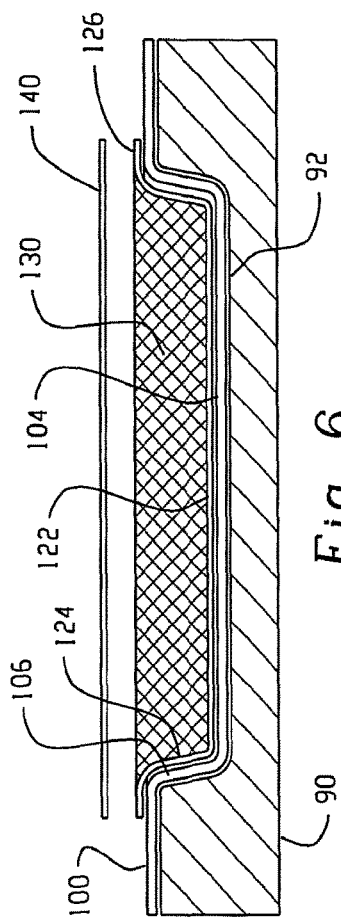
FIG. 6 is a cross-sectional view taken through the first, second, and third layers with a frozen food product inserted into the recess of the second layer.

Turning first to FIG. 1, a first structural layer 100 may adopt a wide variety of configurations, but for ease of reference is shown as a generally square shaped structure having a central recess or cavity 102 including bottom wall 104 and side walls 106. The cavity 102 is shown to be centrally located within the first structural member 100, but it will be appreciated by one skilled in the art that the cavity may adopt a wide variety of conformations and locations within the first structural layer.

A HIPS material for the first structural layer 100 is used because the first layer can be heated quickly. The HIPs has a tendency to fracture at cold temperatures. It is also contemplated that the first layer may be combination or blend that is approximately part HIPS and part polystyrene. This material blend gives off its heat relatively quickly and still fractures at cold temperatures. Importantly, the first structural layer is formed from a food grade quality material, i.e., the material is compatible for use with food.

The depth and location of the cavity 102 within the first structural layer 100 is predetermined to provide sufficient structural integrity to the frozen food product (in this particular instance ice cream), as well as providing the desired thermal properties for formation of the frozen food product.

Figure 4:
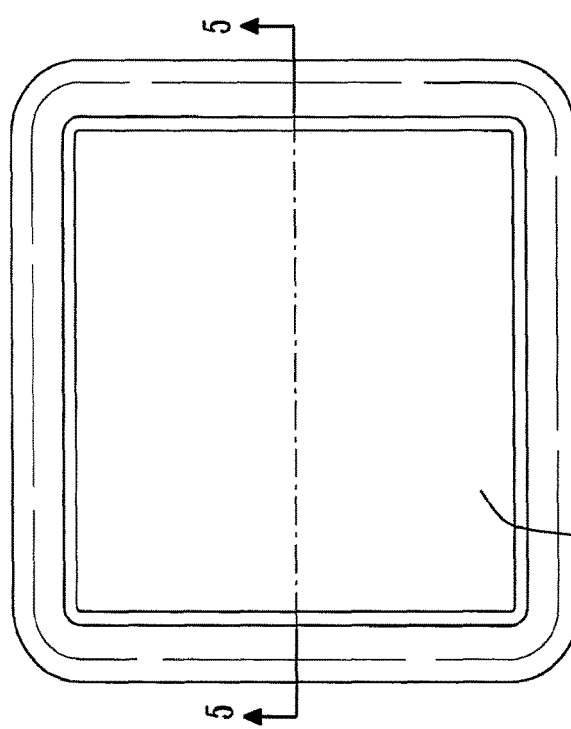
FIG. 4 is a top plan view of a flexible second layer.
Figure 5:
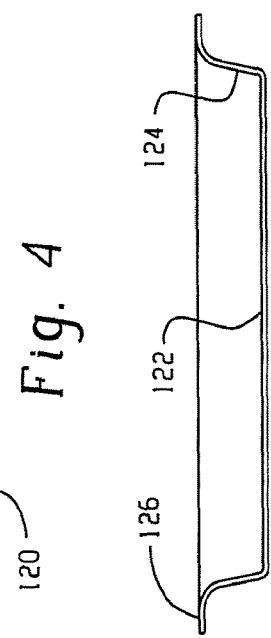
FIG. 5 is a cross-sectional view taken generally along the lines 5-5 of FIG. 4.

Shown in FIGS. 4 and 5 is a second layer 120 which is preferably a thin flexible material layer such as a polyethylene. Again, the polyethylene is preferably a food grade quality so that it can be used as the final package to house the food product. This is desirable for a number of reasons. First is the flexibility of the second layer 120. As is evident in FIG. 6 and as will be discussed further below, this allows the second layer 120 and particularly the central portion thereof to adopt the configuration of the cavity 102 of the first structural layer 100. Second, the thin nature of the flexible second layer 120 cuts down on the overall packaging costs because of the reduced amount of material. Further, the thin walled nature of the flexible second layer 120 also reduces the processing costs since it is an effective thermal transfer layer, i.e., it transfers heat effectively across the layer from the mold, through the first structural layer 100, which is just slightly thicker, and ultimately through the thin wall of the flexible second layer. In addition being flexible allows the second layer 120 to adopt the conformation of the first structural layer 100, which in turn takes the shape of the cavity from the mold, and thus imparts the same configuration to the food product 130 that is introduced into the flexible second layer. As best shown in FIGS. 4 and 5, the second layer 120 includes a central portion 122 and a continuous side wall 124, and also includes a perimeter lip 126 which can also be enlarged for grasping the second layer from the first structural layer 100.

As more particularly evident in FIG. 6, a mold 90 and its central cavity 92 receives the first structural layer. Particularly, the first structural layer of polystyrene/HIPS material is urged into the mold cavity 92 by suction or vacuum. Thus, as seen in FIGS. 2 and 3, the first structural layer is shown in slight spaced relation for ease of illustration only, whereas one skilled in the art will appreciate that the suction/vacuum allows the first structural layer to conform to the interior of the mold. Because of the use of HIPS in the combined material, the first structural layer can be heated rather quickly. Just as importantly, it also gives off its heat and ultimately it fractures at colder temperatures, which is also desirable. As further demonstrated in FIG. 6, with the first structural layer received in the mold, the flexible second layer is then placed in overlying relation so that the perimeter portion 126 is received around the upper edge of the cavity and the central portion 122 and sidewalls 124 extend into mating conformation with bottom wall 104 and sidewall 106 of the first structural layer. Preferably, the flexible second layer is blown down into mating receipt with the first structural layer. For example, heating the first and second layers 100, 120 causes them to cling to one another.

The ice cream 130 is subsequently inserted into the recess formed by the bottom 122 and sidewall 124 of the flexible second layer. Preferably, the ice cream 130 is not permitted to extend beyond the height of the perimeter portion 126 of the flexible second layer. The first and second layers can be turned over at the end of the filling and freezing line, the first structural layer breaks away (and is preferably recycled), and the second layer is peeled away from the hardened ice cream so that the surface of the ice cream that engaged the second layer 120 is then decorated.

Alternatively, a flexible third layer 140 is placed over the filled second layer and perimeter portions 142 are brought together and may be sealed to the perimeter portion 126 of the flexible second layer. Since the third layer is also preferably a thin walled polyethylene, these perimeter portions 126, 142 fusion bond or are otherwise sealed together in a manner that will not have any adverse impact on the ice cream.

Figure 7:
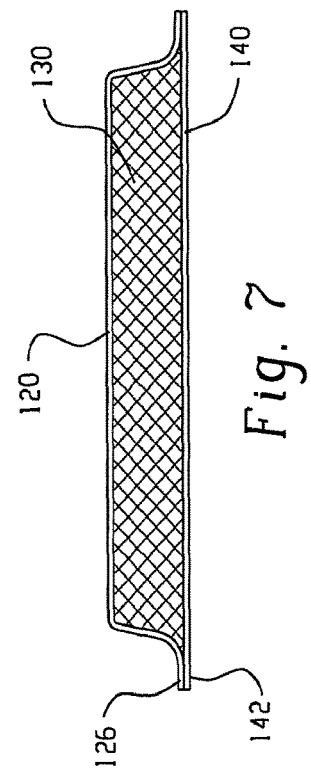
FIG. 7 is a view of the completed frozen food package.

Once the ice cream has been introduced into the recess of the second layer (and sometimes sealed by the third layer), the assembly is introduced into a hardener where the ice cream is subsequently hardened. For example, a cryogenic hardening process may be employed. The advantageous benefit of the first structural layer is that it fractures at cold temperatures. Thus, the first structural layer fractures at the colder temperatures and facilitates removal of the packaged ice cream that is received in the second layer, or alternatively sealed between the second and third layers and shown in FIG. 7. It will be appreciated that the ice cream container is inverted as shown in FIG. 7 so that the planar third layer can be placed or stored on any convenient planar surface. Typically, a cardboard box or other external package as represented by the dotted line 140 is then used. The final frozen food product, in this particular instance the ice cream, can employ a wide variety of 3-D shapes depending on the mold shape.

The different shrinkage rates of the dissimilar materials facilitates the separation between the layers during the thermal processing. It has also been found that it is preferable that no bonding agent be provided between the first structural layer and the flexible second layer of the polyethylene. Thus, the preferred arrangement is to eliminate any bonding agent between the first and second layers.

The disclosure has been described with reference to the preferred embodiments. Obviously, modifications and alterations will occur to others upon reading and understanding the preceding detailed description. It is intended that the invention be construed as including all such modifications and alterations.

Having thus described the invention, it is now claimed:

1. A process of packaging a frozen food product comprising:

providing a mold having a mold cavity;

inserting a first structural layer into the mold cavity, and applying suction or vacuum such that the first structural layer takes the shape of the mold cavity to define a first structural layer cavity;

inserting a flexible second layer in the first structural layer cavity while the first structural layer is disposed in the mold cavity so that a portion of the second layer conforms to the first structural layer cavity to define a recess;

subsequently filling the recess of the flexible second layer with a food product;

applying a third layer over the filled recess of the second layer;

sealing a perimeter of the third layer to a perimeter portion of the second layer;

freezing the food product; and removing the first structural layer from the second layer after the freezing step.

2. The process of claim 1 further comprising providing an external package after the removing step.

3. The process of claim 1 further comprising forming the first structural layer from a material that fractures during the freezing step.

4. The process of claim 1 further comprising forming the first structural layer from a food grade material.

5. The process of claim 4 wherein the first structural layer is a polystyrene.

6. The process of claim 4 further comprising forming the second layer from a food grade material, wherein the second layer is a polyethylene.

7. The process of claim 4 further comprising forming the third layer from a food grade material, wherein the third layer is a polyethylene.

8. The process of claim 1 further comprising blowing the second layer into the first structural layer.

9. The process of claim 8 comprising heating the first layer and the second layer such that the first and second layers cling to one another.

10. The process of claim 1 further comprising subjecting the first structural layer to a sufficiently cold temperature to fracture the first structural layer without impacting the integrity of the second layer.

11. The process of claim 1 further comprising fracturing the first structural layer to separate the first structural layer from the second layer.

12. The process of claim 11 further comprising, recycling the fractured first structural layer.

13. The process of claim 1 further comprising removing the second layer from the food product after the first structural layer has been removed.

14. The process of claim 1 further comprising inverting the first, second, and third layers after the recess has been filled and the second layer and the third layer have been sealed together.

15. The process of claim 14 wherein the food product is ice cream, and further comprising fracturing the first layer to remove the first layer from the second layer, removing the second layer, and decorating the ice cream after the second layer is removed.

16. A process of packaging a frozen food product comprising:

providing a mold having a mold cavity;

inserting a first structural layer into the mold cavity such that the first structural layer takes the shape of the mold cavity to define a first structural layer cavity;

inserting a flexible second layer in the first structural layer cavity while the first structural layer is disposed in the mold cavity so that a portion of the second layer conforms to the first structural layer cavity to define a recess wherein the first structural layer and the second layer are formed from materials having different shrinkage rates during cooling;

subsequently filling the recess of the flexible second layer with a food product;

applying a third layer over the filled recess of the second layer;

sealing a perimeter of the third layer to a perimeter portion of the second layer;

freezing the food product; and removing the first structural layer from the second layer after the freezing step.

17. The process of claim 16 wherein the first structural layer inserting step includes urging the first structural layer into the mold cavity by suction or vacuum such that the first structural layer conforms to the interior of the mold cavity.

18. A process of packaging a frozen food product comprising:

providing a mold having a mold cavity;

inserting a first structural layer into the mold cavity:

applying suction or vacuum such that the first structural layer takes the shape of the mold cavity to define a first structural layer cavity;

inserting a flexible second layer in the first structural layer cavity while the first structural layer is disposed in the mold cavity so that a portion of the second layer conforms to the first structural layer cavity to define a recess;

subsequently filling the recess of the flexible second layer with a food product;

freezing the food product; and removing the first structural layer from the second layer after the freezing step.

19. The process of claim 18 further comprising inverting the first and second layers after the filling and freezing steps and before the removing step.

20. The process of claim 18 wherein the first structural layer is formed of a food grade polystyrene and the second layer is formed from a food grade polyethylene.

* * * * *